United States Patent [19]

Rademaker

[11] 4,327,249

[45] Apr. 27, 1982

[54] DIRECT CURRENT TELEGRAPHY SYSTEMS

[75] Inventor: Gerrit Rademaker, Hilversum, Netherlands

[73] Assignee: U.S. Philips Corporation, New York, N.Y.

[21] Appl. No.: 150,385

[22] Filed: May 16, 1980

[30] Foreign Application Priority Data

Jun. 5, 1979 [NL] Netherlands .................. 7904375

[51] Int. Cl.³ ............... H04B 1/62; H03K 13/02; H04L 15/00
[52] U.S. Cl. ............... 178/3; 328/163; 375/58
[58] Field of Search .......... 375/4, 34, 58, 60, 59; 178/69 A, 69 N, 3; 328/162, 163, 164

[56] References Cited

U.S. PATENT DOCUMENTS

| | | | |
|---|---|---|---|
| 3,523,291 | 8/1970 | Pierret | 375/59 |
| 3,806,807 | 4/1974 | Nakamura | 375/58 |
| 4,156,202 | 5/1979 | Takahashi | 328/163 |

Primary Examiner—Thomas A. Robinson
Attorney, Agent, or Firm—Thomas A. Briody; William J. Streeter; Laurence A. Wright

[57] ABSTRACT

An electronic transmitter for direct current telegraphy systems. In order to limit cross-talk between neighboring telegraph lines it is known to filter telegraph signals prior to transmission to "round-off" their edges. In the present electronic transmitter telegraph signals are given approximately "sinusoidal edges" by the use of a function generator. In FIG. 1 an electronic transmitter comprises an input circuit 1, a switching circuit 2 and an output circuit 3. Binary information signals at an input produce telegraph signals on a telegraph line 6-6'. The output circuit 3 comprises two function generators 15 and 17 and a current source 21. Switches 11 and 14 in the switching circuit 2 control which function generator is operative in response to command signals $D_1$ and $D_2$ from the input circuit. The result is that current pulses from the current source 21 have exponentially varying leading and trailing edges which approximate the sinusoidal edges as shown in FIG. 2.

6 Claims, 4 Drawing Figures

DIRECT CURRENT TELEGRAPHY SYSTEMS

The invention relates to direct current telegraphy systems and more particularly to an electronic transmitter for use in such systems, the electronic transmitter being of a type in which binary information signals are converted into line currents for transmission over a telegraph line.

BACKGROUND OF THE INVENTION

An electronic transmitter of the above type is generally known and is used in systems for single-current telegraphy and telex. The telegraph line to which such a transmitter is connected is usually part of a bundle of transmission lines for information transmission. Consequently, it is important to limit cross-talk of the telegraphy signals transmitted over the telegraph line, to the neighbouring transmission lines to the highest possible extent. Particularly when the neighbouring transmission lines are telephone lines, the noise produced by the cross-talk is annoying because it is audible to telephone subscribers. It is known that cross-talk to neighbouring transmission lines is greater as telegraph signals approach a rectangular shape. Filtering of telegraph signals supplied by the transmitter before they are transmitted over the telegraph line is already known. This reduces the proportion of the higher frequencies in the telegraph signals, so that the shape of the telegraph signals is rounded and, consequently, cross-talk is reduced. Known means to accomplish this are, for example, LC-filters or RC-active filters. LC-filters have the drawback that they are bulky so that they considerably reduce the possibilities to miniaturize the electronic telegraphy transmitter. RC-active filters have the drawbacks that the signal dissipation therein is high, that they must be fed with a supply voltage, and that the high sensitivity of these filters to the tolerances of their components require either precision components or adjusting means, so that the design is economically not so attractive.

OBJECT OF THE INVENTION

It is an object of the invention to provide an electronic transmitter for direct current telegraphy in which the need for filtering is obviated and which generates telegraph signals in which the higher frequencies are absent to a considerable extent.

SUMMARY OF THE INVENTION

According to the invention, an electronic transmitter of the type referred to is characterized in that the output circuit further comprises a function generator device which is coupled to the switching circuit and to the current source, the value of the current supplied by the current source varying in response to level transitions in the command signals, in accordance with a power of e, having a positive exponent and wherein e represents the Napieran base having a value of 2.71828.

An electronic transmitter for direct current telegraphy systems according to the invention has the advantage that the generated (regenerated) telegraph signals are distorted to a low extent only. This is of particular importance when, as is the case for long telegraph lines, a number of these transmitters is arranged in series and the distortion of a connection may add up to a multiple of the distortion of a single transmitter.

An embodiment of an electronic transmitter according to the invention is characterized in that the function generator device comprises two complementary function generators, each comprising a control input connected to the switching circuit and each comprising an output coupled to the current source.

An electronic transmitter according to the invention may be implemented so that the input circuit comprises a switching device having an input and an output, the command signals being applied to the switching device input, and the switching device output being connected to the switching circuit; that the switching device, after a level transition in the command signals from a first level to a second level, produces also a level transition at the output of the switching device after a time $\tau_1$, ($\tau_1 \geq 0$); and that the switching device, after a level transition in the command signals from the second level to the first level produces also a level transition at the output of the switching device after a time $\tau_2$, wherein $\tau_2 > \tau_1$.

BRIEF DESCRIPTION OF THE DRAWINGS

An embodiment of the invention and its advantages will now be further explained by way of example with reference to the accompanying drawings, in which.

Corresponding elements in the different Figures have been given the same reference numerals.

DESCRIPTION OF THE PREFERRED EMBODIMENTS

Figure 1:
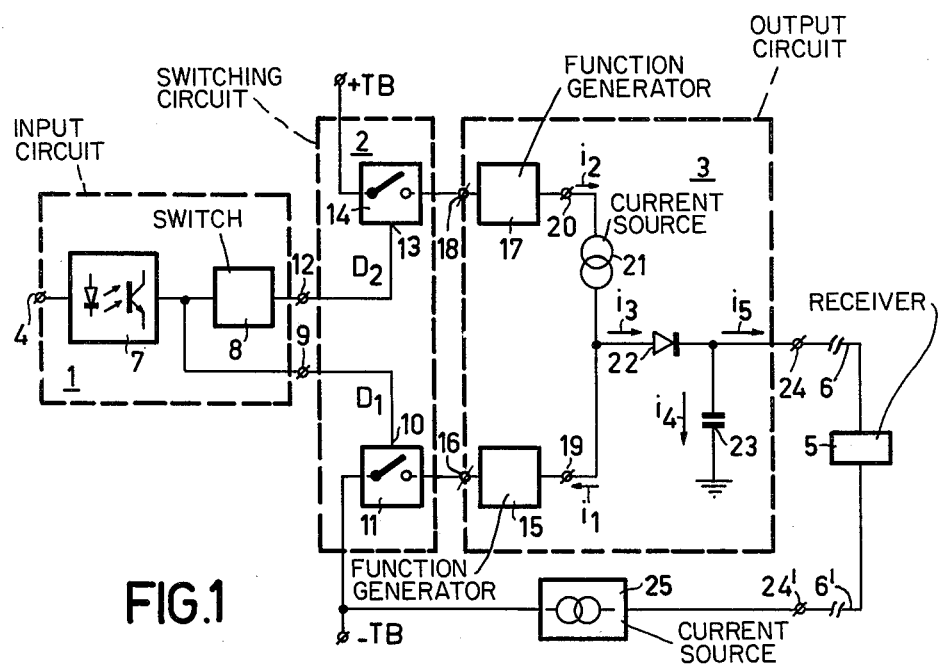
FIG. 1 shows a block diagram of a direct current telegraphy system comprising an electronic transmitter according to the invention.

Referring to FIG. 1, there is shown a block diagram of a direct current telegraphy system conprising an electronic transmitter according to the invention. The electronic transmitter comprises mainly an input circuit 1, a switching circuit 2 and an output circuit 3. Binary information signals which are applied to input 4 of input circuit 1 are converted by the electronic transmitter into telegraph signals which are transmitted in the form of unipolar line currents to a receiver 5 over a telegraph line 6—6'. The input circuit 1 comprises a repeater 7 for generating command signals d.c. isolated from the binary information signals. To this end, repeater 7 comprises opto-electronic coupling elements (as indicated), or transformers or other known means. The command signals generated by the repeater 7 are applied to a first control terminal 10 of a switch 11 via terminal 9, and are applied via a switching device 8 to a second control terminal 13 of a switch 14, which terminal 13 is connected to an output 12 of the switching device 8. The time diagram of a command signal $D_1$, which is applied to the first control terminal 10 of switch 11 is shown in FIG. 2a. Switching device 8 comprises, for example a slow-acting relay, the input signal and output signal of which are of opposite polarity. FIG. 2b shows the time diagram of a command signal $D_2$ which is applied to the second control terminal 13 of switch 14. The purpose and operation of the switching device 8 will be explained hereinafter. The switches 11 and 14 are single-pole switches and respectively connect, depending on the respective values of the command signals at the first and the second control terminals 10 and 13, first and second poles (terminals) of a telegraph battery to the telegraph line 6 via the output circuit 3. In the present embodiment, the first pole is the negative pole −TB of the telegraph battery. Alternatively, the first pole may be connected to ground potential or to the ground of the telegraph battery. In the present embodiment, the second pole is connected to the positive pole +TB of the telegraph battery. The output circuit 3 comprises a first function generator 15 comprising a control input 16 which is connected to the output of switch 11. The function generator 15 which will be further described hereinafter, causes an output current $i_1$ to flow which—within a given operating range—increases exponentially, the sign of the exponent being positive. In addition, the output circuit 3 comprises a second function generator 17 which has a control input 18 which is connected to the output of switch 14. The second function generator 17 is complementary to the first and produces an output current $i_2$ which—within a given operating range—increases exponentially, the sign of the exponent being positive. An output 19 of the first function generator 15 is connected to one terminal of a current source 21 and to the anode of a diode 22, and an output 20 of the second function generator 17 is connected to the other terminal of the current source 21. The current source 21, to be described hereinafter, causes a current $i_3$ to flow through diode 22. The cathode of diode 22 is connected to a terminal 24 to which telegraph line part 6 is connected. The cathode of diode 22 is also connected to a reference point of constant voltage, for example ground, via a capacitor 23. The negative pole −TB of the telegraph battery is connected to a terminal 24' via a limiter 25 which is constituted by a current source, the telegraph line part 6' being connected to terminal 24'.

Figure 2:
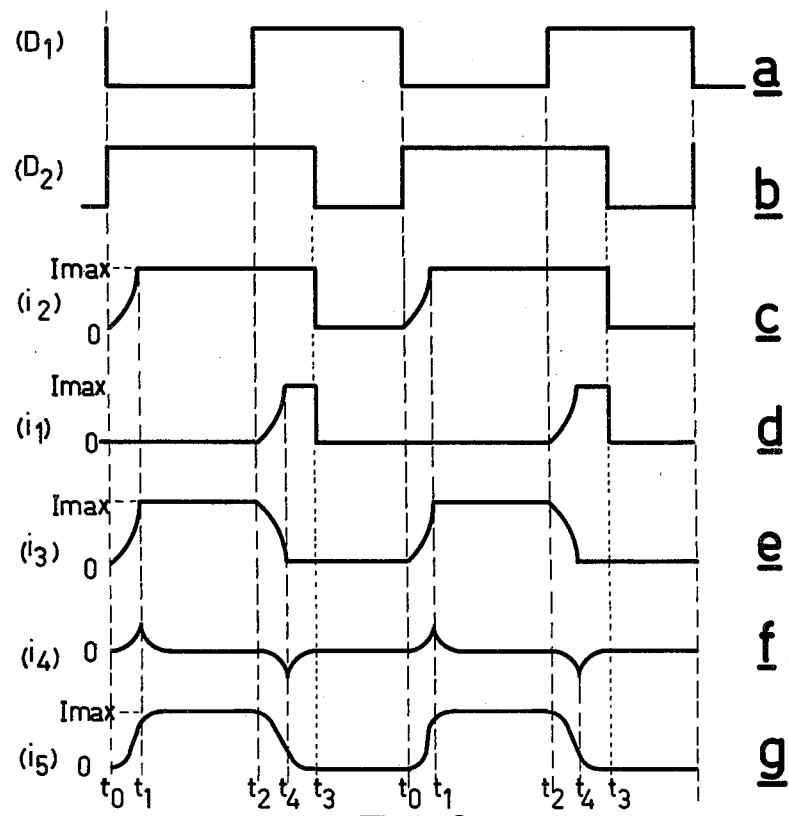
FIG. 2 including A–G, shows some time diagrams for explaining the operation of the transmitter of FIG. 1.

The operation of the electronic transmitter shown in FIG. 1 will now be further explained, reference also being made to the time diagrams of FIGS. 2. The command signal $D_1$ which is applied to the control terminal 10 of switch 11 is a bi-level signal having a first, low level during a period of time $t_0$–$t_2$ and a second, high level during a period of time $t_2$–$t_0$. During the low level, switch 11 is closed, in response to which the function generator 15 has an output current $i_1 = 0$ (FIG. 2d). The command signal $D_2$ which is applied to the control terminal 13 of switch 14 also has two levels. However, signal $D_2$ is a high level during a period of time $t_0$ to $t_3$, in response to which switch 14 is opened, and during a period of time $t_3$ to $t_0$ $D_2$ it has a low level, in response to which switch 14 is closed and function generator 17 produces an output current $i_2 = 0$ (FIG. 2c). When the level of command signal $D_2$ changes from low to high (at the instant $t_0$) switch 14 is opened and the function generator 17 produces an output current $i_2$ which, during a period of time $t_0$ to $t_1$, increases in accordance with an exponential function having a positive exponent (FIG. 2c). The current source 21, which produces a current which corresponds to the output current of the function generator 17 during the period $t_0$–$t_1$, is controlled with this current $i_2$. At the instant $t_1$, current from current source 21 reaches its maximum value $I_{max}$, causing a current $I_{max}$ to be produced during the remainder of the period, namely the period $t_1$–$t_3$. During the period of time that switch 11 is closed under the control of command signal $D_1$, $i_1 = 0$ and the current $i_3$ will be equal to the current produced by the current source 21 (FIG. 2e). At the instant $t_2$, switch 11 is opened in response to command signal $D_1$, causing an exponentially increasing current $i_1$ to flow through function generator 15 (FIG. 2d), this current being produced by the current source 21. This current increases until the maximum value $I_{max}$ of current that the current source 21 is capable of producing has been reached. The current $i_3$ will decrease as a result of the current $i_1$ flowing to function generator 15 and will reach a value zero at the instant that $i_1$ has reached the value $I_{max}$ (FIG. 2e). At instant $t_3$, the command signal $D_2$ becomes low, causing switch 14 to close and function generator 17 to be switched off, so that output current $i_2$ has a value zero.

The current $i_1$ will then also assume a value zero as diode 22 prevents capacitor 23 from supplying current for function generator 15. On balance, this does not change current $i_3$ and it keeps value zero until $t_0$, whereafter the cycle is repeated. From diagram e in FIG. 2 it will be apparent that the current $i_3$ has a discontinuous derivative at the instants $t_1$ and $t_2$ of the polarity transitions of $D_1$. From the Fourier analysis it is known that it is precisely such discontinuities which are responsible for the occurrence of higher frequencies in telegraph signals and which are therefore also reponsible for cross-talk in neighbouring telephone lines, as this cross-talk increases with frequency. To prevent telegraph signals having these discontinuities from being transmitted, the capacitor 23 is charged or discharged by means of current $i_3$ via diode 22. Diagram f shows the variation of the current $i_4$ through the capacitor 23. From instant $t_1$ onwards capacitor 23 is discharged in accordance with an exponential function having a negative exponent. The current $i_5$ which is applied to the line—the line current—has a shape as shown in FIG. 2g. The edges of the telegraph signals are composed of exponential portions from $t_0$–$t_1$ and $t_2$–$t_4$, respectively, having a positive exponent and exponential portions from $t_1$ until $I_{max}$ and from $t_4$ until $i = 0$. Together, these two powers of e approach a sinusoid, namely, a shape in which higher harmonics are absent. From measurements performed with a so-called psophometer it appeared that the remaining noise level is very low and that it more than satisfies the relevant CCITT requirements.

The electronic transmitter shown in FIG. 1 is suitable for several telegraphic speeds. The frequency of the sinusoid at the edges of the telegraph signals can be matched in a simple way to the telegraphic speed by means of the value of the capacitance of capacitor 23 and by a setting, still further to be described, of the function generators 15 and 17.

Figure 3:
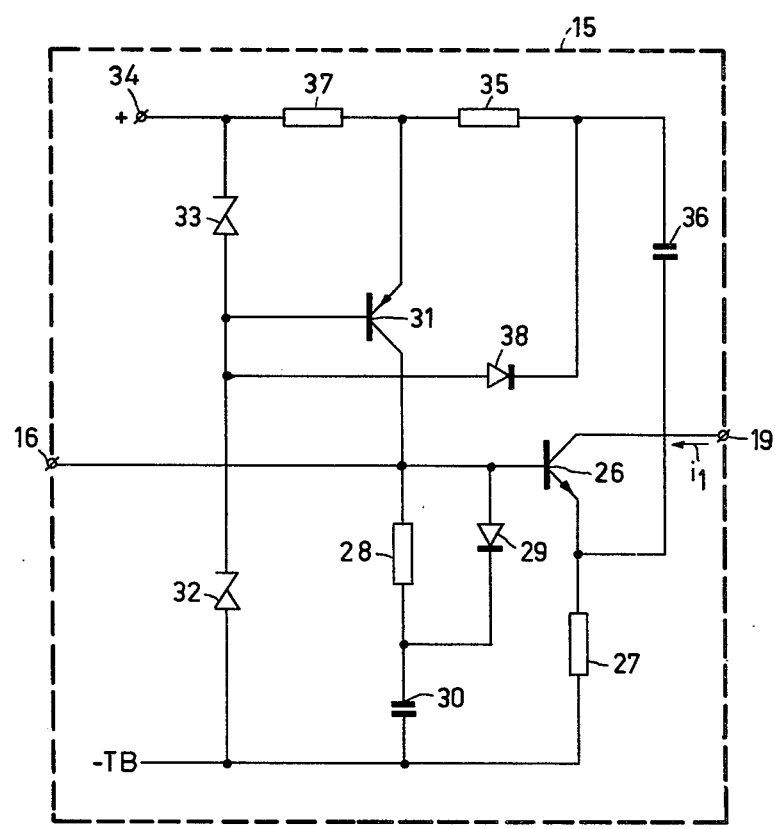
FIG. 3 is a circuit diagram of an embodiment of a function generator, for the performance of the invention, which supplies a signal whose value varies in accordance with a power of e having a positive exponent.

FIG. 3 shows a circuit diagram of an embodiment of a function generator 15 which produces a signal which varies in accordance with a power of e having a positive exponent. The function generator comprises an npn-transistor 26 which has its base connected to the control input 16, its collector to the output 19 and its emitter to the negative pole −TB of the telegraph battery via a resistor 27. In addition, an arrangement consisting of a parallel arrangement of a resistor 28 and a diode 29 in series with a capacitor 30 is connected between the base of transistor 26 and the negative pole −TB. In the closed condition of switch 11 (FIG. 1), the control input 16 has a potential −TB and transistor 26 will be cut off, in response to which collector current $i_1$ has a value equal to zero. In addition, the function generator 15 comprises a pnp-transistor 31 which has its base connected to the negative pole −TB via a first Zener diode 32 and to a reference point 34 via a second Zener diode 33. The voltage at the reference point 34 is between −TB and +TB. The collector of transistor 31 is connected to the control input 16, and a series arrangement of a resistor 35 and a capacitor 36 is connected to the emitter of transistor 26. In addition, the emitter of transistor 31 is connected to the reference point 34 via a resistor 37, and the base of transistor 31 is connected via a diode 38 to the common junction point of resistor 35 and capacitor 36. When switch 11 (FIG. 1) is closed, transistor 31, whose base voltage is set by the Zener diodes 32 and 33, will start conducting and the collector current will be applied from the control input 16 to the negative pole −TB via switch 11. Capacitor 36 is charged to a voltage which is substantially equal to the voltage of the reference point. Capacitor 36 has a high capacitance value (for example 10 μF).

When switch 11 is opened, the collector current of transistor 31 will charge capacitor 30 via resistor 28 and diode 29. In response thereto the base voltage of transistor 26 increases, and transistor 26 becomes conductive. Also, the emitter voltage of transistor 26 increases, this increase being transferred via the charged capacitor 36 and resistor 35 to the emitter of transistor 31. This causes the collector current of transistor 31 to increase and capacitor 30 gets an additional charge. The result of the above procedure is that the collector current of transistor 26 increases in accordance with a power of e with a positive exponent. The exponent of e is determined by the value of resistor 35 and the capacitance of capacitor 30. The choice of the values of these elements is one of the factors which determine the frequency of the "sinusoidal" edges.

Figure 4:
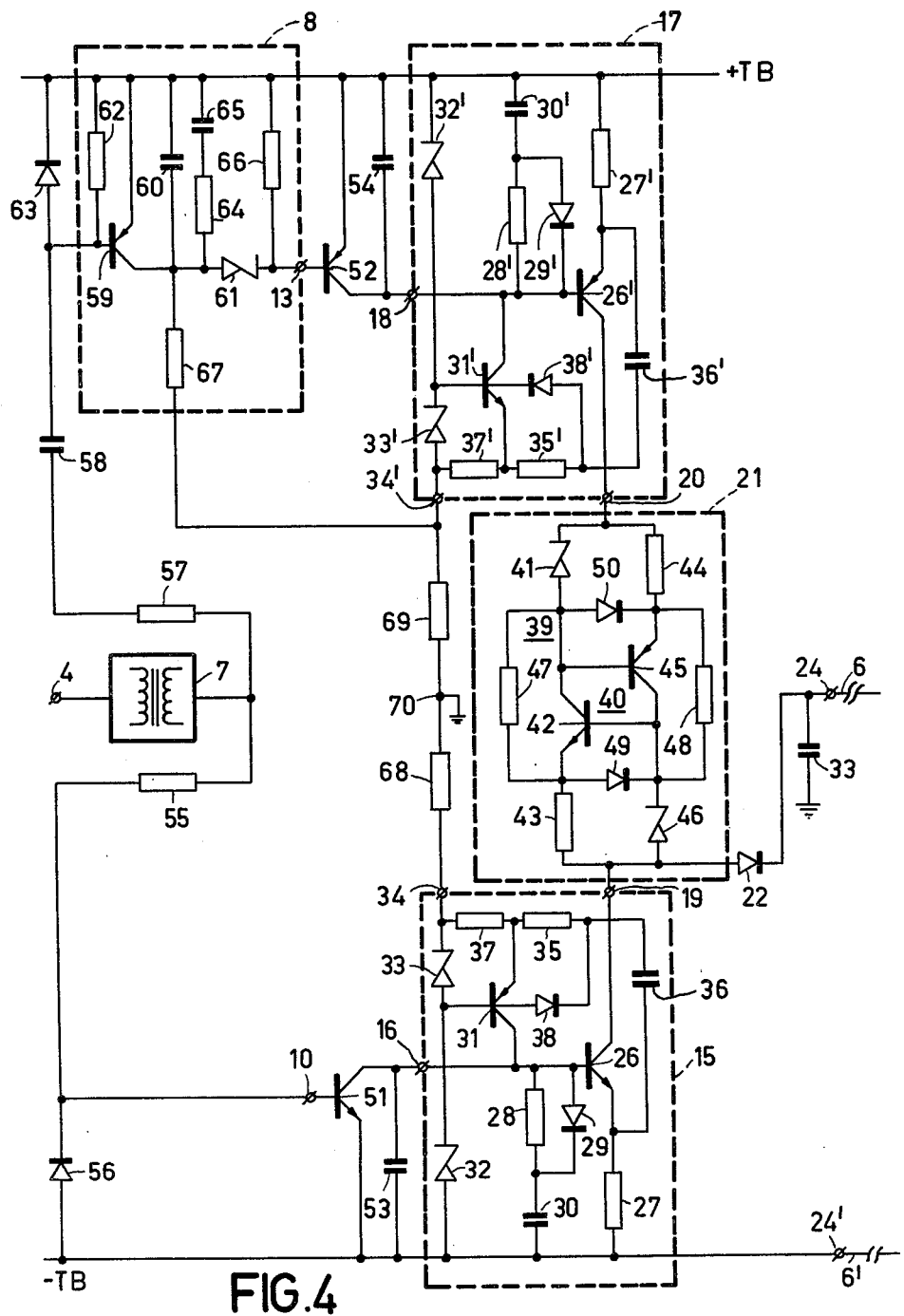
FIG. 4 is a circuit diagram of an embodiment of an electronic transmitter according to the invention.

FIG. 4 shows a circuit diagram of an embodiment of an electronic transmitter. The function generator 17 shown in this circuit diagram is complementary to function generator 15; the reference numerals of function generator 17 correspond to those of function generator 15, but they are primed. Function generator 15 withdraws current from current source 21 via output 19 and function generator 17 supplies current to current source 21 via output 20.

Although alternative embodiments are possible, current source 21 in FIG. 1 is preferably constructed in the manner shown in FIG. 4, and known per se from, for example, "Valvo Technische Informationen für die Industrie", No. 132, August 1969. Current source 21 in FIG. 4 is comprised of two parallel branches 39 and 40, branch 39 comprising, viewed in the direction of the current supplied, in this order, a Zener diode 41, the collector-emitter path of an npn-transistor 42 and a resistor 43, and branch 40 comprising, in this order, a resistor 44, the emitter-collector path of a pnp-transistor 45 and a Zener diode 46. The Zener diodes 41 and 46 produce the base voltages for the transistors 45 and 42. Current source 21 has two operating ranges. In the first operating range, which applies when the voltage $V_s$ across the current source 21 is higher than the so-called collector saturation voltage $V_k$, current source 21 operates as a pure current source. In this range the current through Zener diode 41 is substantially equal to the emitter current of transistor 42, this latter current being exclusively determined by the Zener voltage of diode 46 in branch 40, the base-emitter voltage $V_{BE}$ of transistor 42 and the value of the resistor 43. This means that the current through branch 39 is independent of the voltage $V_s$ across current source 21. The same holds for the current through branch 40 and, consequently, also for the total amount of current produced by current source 21.

In the second operating range which holds, when the voltage $V_s$ across the current source 21 is below the so-called collector saturation voltage $V_k$, the current source 21 operates as a voltage-controlled current source. Therefore, current source 21 is capable of producing a current which increases with an increasing voltage across the current source (from approximately 0 mA) and produces a constant current $I_{max}$ from a given voltage onwards. In single-current telegraphy systems, $I_{max}$ usually has a prescribed value of 40 mA.

The emitter-collector path of each of the transistors 42 and 45 is shunted by a resistor 47, 48 in order to reduce the dissipation of the transistors 42 and 45. Diodes 49 and 50, whose terminals are connected in opposite sense to the base-emitter diodes of transistors 42 and 45 and which have for their object to limit the base-emitter voltage of the transistors 42 and 45, are arranged in parallel with the base-emitter junctions of transistors 42 and 45.

In FIG. 4 the switches 11 and 14 of FIG. 1 are implemented as semiconductors, namely as transistors 51 and 52. The collector of npn transistor 51 is connected to the control input 16 of the first function generator 15 and the emitter is connected to the negative terminal of the telegraph battery. In addition, the collector of transistor 51 is connected to the negative pole −TB of the telegraph battery via a capacitor 53. The collector of pnp-transistor 52 is connected to the control input 18 of the second function generator 17 and, via a capacitor 54, to the positive pole +TB of the telegraph battery. The emitter of transistor 52 is also connected to pole +TB. The bases of the transistors 51 and 52, respectively, are connected to the first and the second control terminals 10 and 13, respectively, of the electronic transmitter of FIG. 1.

The command signals $D_1$ and $D_2$, which must be applied to the control terminals 10 and 13, are generated from the binary information signals. To this end these signals are applied to input terminal 4 of a repeater 7 which is in the form of an opto-electronic coupling element or in the form of an oscillator with d.c. coupling. The further description of FIG. 4 is based on a repeater comprising an oscillator which oscillates or does not oscillate in dependence on the level of the binary information signal. The oscillator frequency is much higher than the transmission speed and is, for example, 1 MHz.

Command signal $D_1$ for control input 10 is generated as follows. When the oscillator in repeater 7 is switched on a (a.c.) voltage signal is applied to the base of transistor 51 via resistor 55, in response to which this transistor will start conducting in the rhythm of the frequency of this signal. The collector signal of transistor 51 is smoothed by capacitor 53 and applied to the base of transistor 26 of the function generator 15, in response to which this transistor is rendered non-conductive. Consequently, the function generator 15 does not withdraw any further current from the current source 21. When, on the contrary, the oscillator in repeater 7 is switched off, transistor 51 is cut-off and transistor 26 of function generator 15 will be rendered conductive in the manner described for FIG. 3. There is arranged between the base of transistor 51 and the negative pole −TB of the telegraph battery a diode 56 with the orientation shown in the Figure, and having for its function to prevent the base voltage of transistor 51 from becoming too low.

Command signal $D_2$ for control input 13 is generated as follows. When the oscillator in repeater 7 is switched on in response to the binary information signal applied to input terminal 4 a (a.c. voltage) signal is applied via a series arrangement of a resistor 57 and a capacitor 58 to the base of transistor 59, in response to which this transistor will start conducting in the rhythm of the frequency of this signal. The collector signal of transistor 59 will be smoothed by a capacitor 60 and, via a Zener diode 61, applied to the base of transistor 52, which is rendered non-conductive thereby. In response, transistor 26' of function generator 17 becomes conductive in the manner already described for FIG. 3. There is arranged between the base of transistor 59 and the positive pole +TB of the telegraph battery a parallel arrangement of a resistor 62—for setting the voltage at base of transistor 59—and a diode 63, with the orientation shown in the Figure, to prevent the base voltage of transistor 59 from becoming too high.

When the oscillator in repeater 7 is switched-off transistor 59 is cut-off and transistor 52 will start conducting, causing transistor 26' of function generator 17 to be cut-off, so that it, consequently, does not apply current to current source 21. However, transistor 52 will not become immediately conductive. A series arrangement of a resistor 64 and a capacitor 65 is provided between the collector of transistor 52 and the positive pole +TB of the telegraph battery. Capacitor 65 was charged during the preceding period transistor 59 was conductive and will now be discharged via resistor 64 and a resistor 67, present between the collector of transistor 59 and reference point 34'. This discharge current will keep transistor 52 in the cut-off condition for a period of time which is determined by the time constant and the resistance value ratio of resistors 64 and 67. The base voltage setting of transistor 52 is further determined by a resistor 66, arranged between the base and the positive pole +TB.

In addition, the electronic transmitter comprises a resistor 68, which is connected between the reference point 34 of function generator 15 and a point 70 of for example, ground potential, and a resistor 69 arranged between the reference point 34' and point 70.

What is claimed is:

1. An electronic transmitter for direct current telegraphy systems, in which transmitter binary information signals are converted into line currents for transmission over a telegraph line, and which transmitter comprises; an input circuit for generating command signals from the information signals, a telegraph voltage source having a first terminal and a second terminal, a switching circuit controlled by the command signals for connecting one of the two terminals of the telegraph voltage source to the telegraph line, and an output circuit coupled to the switching circuit and the telegraph line and comprising a current source for applying line current to the telegraph line, characterized in that the output circuit further comprises a function generator device which is coupled to the switching circuit and to the current source, the value of the line current supplied by the current source varying in response to level transitions in the command signals, in accordance with a power of e having a positive exponent.

2. An electronic transmitter as claimed in claim 1, characterized in that the function generator device comprises two complementary function generators, each comprising a control input which is connected to the switching circuit and each comprising an output which is coupled to the current source.

3. An electronic transmitter as claimed in claim 1 or claim 2, characterized in that the output circuit further comprises a capacitor arranged in parallel with the telegraph line.

4. An electronic transmitter as claimed in claim 1, characterized in that the input circuit comprises a switching device having an input and an output, the command signals being applied to the switching device input, and the output of the switching device being connected to the switching circuit, in that after a level transition in the command signals from a first level to a second level the switching device produces also a level transition at the output of the switching device a period of time $\tau_1$ later ($\tau_1 \geq 0$) and in that after a level transition in the command signals from the second level to the first level the switching device also produces a level transition at the output of the switching device a period of time $\tau_2$ later, wherein $\tau_2 > \tau_1$.

5. An electronic transmitter as claimed in claim 4, characterized in that the switching circuit comprises a first and a second control terminal, in that the output of the switching device is connected to the first control terminal and in that the input of the switching device is connected to the second control terminal for applying the command signals generated from the information signals to the control terminals.

6. An electronic transmitter as claimed in claim 2, characterized in that each function generator comprises a first and a second transistor, in that the base of the first transistor and the collector of the second transistor are connected to the control input, in that the first transistor has its emitter connected to a first voltage reference point via a first resistor and its collector connected to an output, in that the collector of the second transistor is connected to the first reference point via an arrangement consisting of a parallel arrangement of a second resistor and a diode in series with a first capacitor, and the emitter of the second transistor is connected to a second voltage reference point via a third resistor, in that the emitter of the first transistor is connected to the emitter of the second transistor via a series arrangement of a second capacitor and a fourth resistor, and in that the base of the second transistor is connected to the first reference point via a first Zener diode and to the second reference point via a second Zener diode.

* * * * *

UNITED STATES PATENT AND TRADEMARK OFFICE
CERTIFICATE OF CORRECTION

PATENT NO. : 4,327,249
DATED : April 27, 1982
INVENTOR(S) : GERRIT RADEMAKER

It is certified that error appears in the above—identified patent and that said Letters Patent is hereby corrected as shown below:

Claim 4, line 10 - change "$(T_i \geq O)$" to --$(T \geq O)$--

Signed and Sealed this

Twelfth Day of October 1982

[SEAL]

Attest:

GERALD J. MOSSINGHOFF

Attesting Officer     Commissioner of Patents and Trademarks